Feb. 7, 1933.   G. M. HARTSOCK   1,896,893
GEAR SHIFTING DEVICE
Filed April 20, 1931

INVENTOR.
Guy M. Hartsock
BY
ATTORNEYS.

Patented Feb. 7, 1933

1,896,893

UNITED STATES PATENT OFFICE

GUY M. HARTSOCK, OF DETROIT, MICHIGAN, ASSIGNOR, BY MESNE ASSIGNMENTS, TO FREE WHEELING PATENTS CORPORATION, OF SOUTH BEND, INDIANA, A CORPORATION OF DELAWARE

GEAR SHIFTING DEVICE

Application filed April 20, 1931. Serial No. 531,433.

This invention relates to improvements in gear shift levers for shifting transmission gears and especially to gear shift levers adapted to be used in combination with transmissions containing overrunning clutch elements.

Heretofore gear shift levers have been constructed of a solid rod tapered from the bottom toward the top thereof and having a comparatively small cross sectional area. Also the gear shift levers heretofore used with transmissions having an overrunning clutch mechanism, have comprised a solid tapered rod for shifting the gears and a small rod parallel to and secured to the gear shift rod for operating the locking means for the overrunning clutch mechanism.

It is an object of this invention to provide a tubular gear shift lever having a comparatively large cross sectional area and to form said lever in such a manner that vibrations arising in the transmission will be perceptibly dampened before reaching the extremity of the lever to which the knob is secured.

It is a further object of this invention to provide an attractive and unitary knob structure for a gear shift lever used to operate a variable speed transmission embodying an overrunning clutch mechanism.

It is also an object to combine a tubular transmission lever with the operating lever for the lock-out of the overrunning clutch mechanism so that the said operating lever lies within and is concealed by the tubular gear shift lever.

Other objects and features of construction and combination of parts will appear in the following description which is to be taken with reference to the accompanying drawing which shows a preferred form in which the subject matter of this invention may be applied.

In the accompanying drawing which illustrates a suitable embodiment of the present invention;

Figure 2:
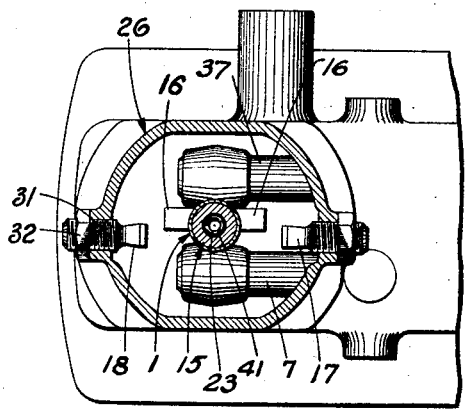
Figure 2 is a sectional view taken substantially on the line 2—2 of Figure 1 looking in the direction of the arrows.
Figure 1:
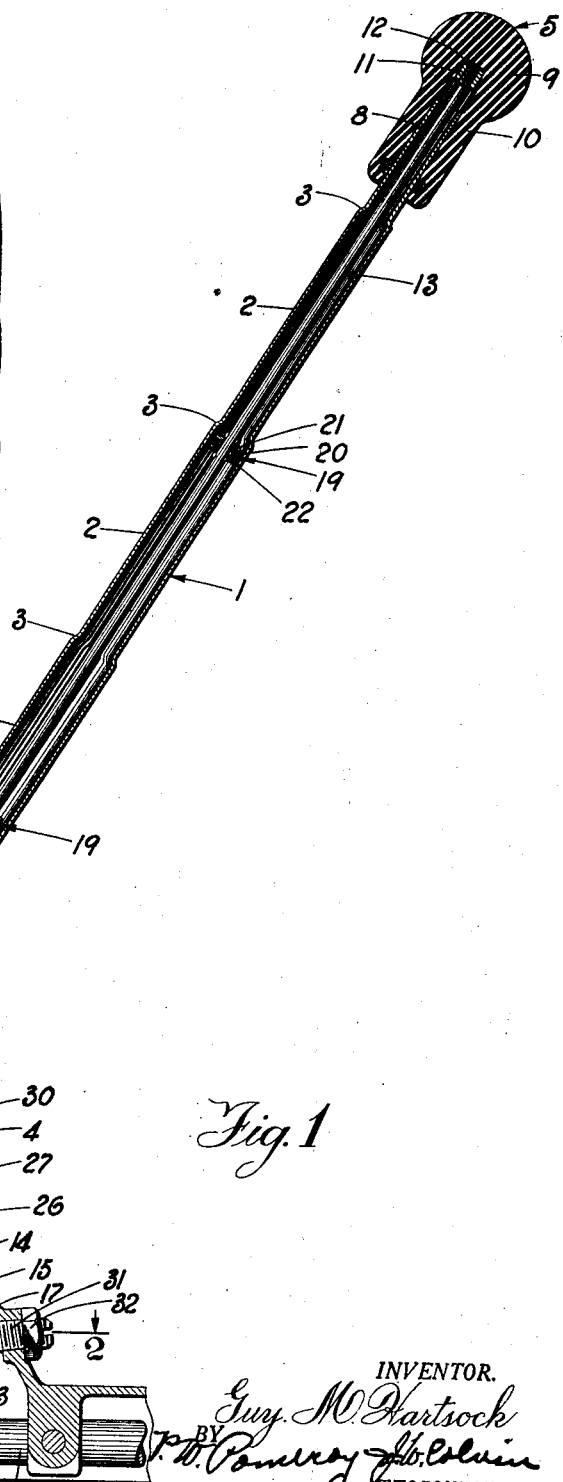
Figure 1 is a vertical sectional view of my improved gear shift lever, and also shows stop means for an overrunning clutch device, and a fragmentary portion of the mechanism actuated by the gear shift lever.

In the drawing in which like numerals refer to like parts throughout the several views, 1 indicates generally my improved gear shift lever which is composed of cylindrical sections 2 connected by off-set or reducing portions 3, the circumferential dimension of said cylindrical sections gradually decreasing from the bottom portion of the lever above the universal mounting 4 towards the upper extremity of the lever. It has been found that this construction tends to perceptibly dampen any vibrational effects imparted to the lower end of the lever by reason of its connection with the transmission, in which vibrations may be set up and transmitted to the gear shift lever.

This dampening effect is probably due to at least two important features of the present design. As the gear shift lever is tubular instead of solid, it will have a much greater sectional modulus in proportion to its weight and will therefore, be rendered considerably stiffer so that a harmonic vibration imparted to the fixed end will not produce a resilient distortion of the lever that will tend to build up a pendulum vibration. Also, as the weight of the lever has been greatly decreased, the vibrational forces will have a comparatively small effect.

The other feature of the design referred to is the specific construction of the tubular shaft which consists of a series of cylindrical sections, the walls of each section being parallel to the axis and having no taper. The sections however are of progressively decreasing diameter, from the fixed point toward the free end of the lever and are joined together at their respective ends by sharply tapered or offset portions. In this construction, if a vibration, especially a harmonic vibration is imparted to the lever at the fixed end thereof, each portion of the lever where two cylindrical sections of different diameter are joined together, acts as a secondary point of support, and the vibrations are thereby broken up among the different cylindrical sections.

Below the universal mounting 4 the lever comprises a cylindrical section of somewhat reduced circumferential dimension and to the bottom end of this last named cylindrical section there is fixedly secured a member 6 which has an extension terminating in a ball 6a that cooperates with the sliding bars 7 and 37 to shift the gear elements of the transmission to accomplish the speed ratio desired. Mounted on the upper cylindrical section 8 of the gear shift lever, there is a knob generally indicated as 5 which comprises, a ball 9 and a sleeve portion 10, the sleeve portion being adapted to fit over the upper cylindrical section 8 of the gear shift lever and to slide axially thereon.

It has been pointed out as one of the objects of this invention, to provide a more attractive knob for a gear shift lever, especially for a gear shift lever to be used with a transmission including an overrunning clutch element. At present this knob comprises a non-metallic ball portion centrally provided with a vertical bore and having a separate button inserted in the top for operating the overrunning clutch lock-out. The present invention provides a preferably non-metallic knob having an integral sleeve. This sleeve portion fits around the free end of the gear shift lever and is adapted to move the lever for shifting the gears. The sleeve portion is also axially slidable upon the gear shift lever whereby the entire knob may be manually depressed relative to the gear shift lever. Secured within the ball portion 9 of the knob there is a metallic sleeve 11 internally threaded to receive the threaded upper end 12 of a rod member 13 which extends axially through the tubular gear shift lever and is axially movable upon depression of the knob. This rod member 13 is operatively connected at 14 to a slidable element 15 which has an extension 16 that cooperates with stop members 17 and 18 to limit the motion of the sliding bar 7 for a purpose to be later defined. The slidable element 15 consists of a cylindrical portion 15a, slidable axially inside the lower end of the tubular gear shift lever 1, and having on the lower end thereof extensions 16 which project laterally through slots 40 in the tubular lever 1 to normally engage the stops 17 and 18. The cylindrical member 15 has an axial bore 41 to receive the upper end of a compression spring 23, and a second axial bore 42 to receive the lower end of the rod 13. Upward motion of the member 15 is limited by contact of the extensions 16 with the top of the slots 40.

Mounted in the lower end of the lever between the sliding element 15 and the element 6 there is a coiled compression spring 23 which tends to resist downward motion of the rod 13, one end of the spring being supported in the depression 33 in the member 6, and the opposite end extending into the bore 42 in the member 15. From an inspection of Figure 2, it will be observed that the extension 16 of the slidable element 15 and the adjustable stop members 17 and 18 are positioned eccentrically of the axis of the lever 1 upon opposite sides thereof for a purpose to be later described.

At spaced intervals upon the rod 13 there is provided a series of guiding elements 19, each element consisting of a fibrous washer member 20 supported on either side by a smaller washer member 21 which in turn is secured to the rod by protrusions 22 struck out of the rod 13 on either side of the guiding element.

Mounted upon the lever 1 is a ball 24 which fits in a socket 25 in the uppermost portion of the transmission cover 26. Below the ball is a packing member 27 and below this packing member is a spiral spring 28, which has an abutment 29 in the cover 26 and thrusts upwardly against the packing member 27 to compress the packing member and cause it to form a seal between the ball 24 and the cover 26, and which also causes the packing member to press upwardly on the ball 24 to retain it in position in the socket 25. Secured to the shaft 1 and extending about the upper portion of the cover 26, there is a guard plate 30.

The stop members 17 and 18 are adjustably secured in the cover 26 by being screw threaded therein at 31 and are provided with a lock nut 32 to retain them in adjusted position.

The operation of the device is as follows:

In this particular construction the overrunning clutch element, not shown, lies between the intermediate and third speed elements of the transmission, the first and reverse speed elements not being affected thereby. The gear shift lever 1 therefore, may be moved to place the transmission mechanism in first speed or reverse by shifting the bar 37 without having the motion thereof affected by the stop members 17 and 18 and the extension 16, due to the eccentric positions of these elements as described above. However, in shifting into second or third speed by shifting the bar 7, the extension 16 will come into contact with the stop member 17 or 18 and this contact will limit the motion of the sliding bar 7 to such an extent that the overrunning clutch element will be operative. When it is desired to render inoperative or to lock-out the overrunning clutch mechanism, the knob 5 is manually depressed to move it axially along the lever 1. This motion of the knob moves the rod 13 axially of the lever 1 against the resistance of the coiled spring 23 and so alters the position of the member 15, that the extension 16 will no longer contact with the stop member 17 or 18. In this position of the member 15, a further motion of the lever 1 in the direction of shifting will carry the sliding bar 7 beyond the previously limited position and will render inoperative or lock out the over-running clutch mechanism.

Having now fully described my invention and the operations thereof so that its construction and use will be clearly apparent to others skilled in the art, what I desire to protect by Letters Patent of the United States is as follows:

1. A gear shift lever comprising, a stepped tubular outer member, an inner member axially movable within said outer member, a knob carried by one end of said inner member slidable on said outer member, a stop member carried by the other end of said inner member slidable in said outer member, and guide means between said inner member and said outer member comprising, a non-metallic washer surrounding said inner member and bearing against said outer member, and metallic washers surrounding said inner member and bearing against said non-metallic washer retained in position by protuberances struck out of said inner member.

2. A gear shift lever comprising, a stepped tubular outer member provided with oppositely disposed slots in one end, an inner member axially movable within said outer member, a knob carried by one end of said inner member slidable on said outer member, and a stop member carried by the other end of said inner member slidable in said outer member, said stop means comprising, a cylindrical portion axially slidable in said outer member, and lateral extensions projecting on opposite sides of said cylindrical portion through said slots in said outer member.

3. In gear shifting means for a variable speed vehicle transmission, a pair of slidable transmission elements, and a gear shift lever comprising, a stepped tubular outer member, an inner member axially movable within said outer member, a knob carried by the upper end of said inner member slidable on said outer member, a stop member carried by the lower end of said inner member slidable in said outer member, a member having a depending portion for operatively engaging said transmission elements fixed in the lower end of said outer member, and a compression spring between said last named member and said stop member to maintain said stop member, said inner member and said knob in a raised position relative to said outer member.

4. A tubular gear shift lever having a bent intermediate portion and reduced end portions, the reduction between the intermediate portion and one end portion comprising, a series of stepped sections joined by integral offset portions.

5. A tubular gear shift lever having an enlarged bent intermediate portion and reduced end portions, the reduction between the intermediate portion and one end portion comprising, a series of stepped sections joined by integral offset portions, and the reduction between the intermediate portion and the other end portion comprising a single integral offset portion.

6. A gear shift lever comprising, a tubular outer member having consecutive cylindrical portions successively decreasing in diameter from an intermediate portion to one end thereof, an inner member slidable in said outer member, and guide means comprising, disk shaped washers mounted on said inner member, said washers being of different diameters to fit within different cylindrical portions of said outer member.

Signed by me at Detroit, Michigan, this 14 day of April, 1931.

GUY M. HARTSOCK.